(No Model.) 3 Sheets—Sheet 1.

H. STRAIT.
POTATO DIGGER.

No. 328,079. Patented Oct. 13, 1885.

WITNESSES
W. W. Mortimer
E. G. Siggers

Hiram Strait
INVENTOR by C. A. Snow & Co.
Attorneys (No Model.) 3 Sheets—Sheet 2.

H. STRAIT.
POTATO DIGGER.

No. 328,079. Patented Oct. 13, 1885.

WITNESSES
W. W. Mortimer.
E. G. Siggers.

Hiram Strait
INVENTOR
by C. A. Snow & Co.
Attorneys (No Model.) 3 Sheets—Sheet 3.

H. STRAIT.
POTATO DIGGER.

No. 328,079. Patented Oct. 13, 1885.

WITNESSES
W. W. Mortimer
E. G. Siggers

Hiram Strait
INVENTOR
by C. A. Snow & Co.
Attorneys

N. PETERS, Photo-Lithographer, Washington, D. C.

UNITED STATES PATENT OFFICE.

HIRAM STRAIT, OF TROY, NEW YORK.

POTATO-DIGGER.

SPECIFICATION forming part of Letters Patent No. 328,079, dated October 13, 1885.

Application filed July 9, 1884. Serial No. 137,246. (No model.)

*To all whom it may concern:*

Be it known that I, HIRAM STRAIT, a citizen of the United States, residing at Troy, in the county of Rensselaer and State of New York, have invented a new and useful Potato-Digger, of which the following is a specification, reference being had to the accompanying drawings.

This invention relates to potato-diggers, and especially to that class of the same in which a share for opening the soil is used in connection with a rotating fingered cylinder by which the potatoes are separated from the soil and thrown out upon the surface, and is an improvement on Letters Patent Nos. 210,061 and 252,538, granted to me November 19, 1878, and January 17, 1882, respectively.

The objects of the present invention are, first, to provide adjustable shares in line with the casters and driving-wheels to clear all obstructions from the common track, thereby giving a uniform level to the apparatus, so as to avoid too frequent adjustments; second, to provide an improved form of share which will force the soil inward instead of outward, as heretofore; third, to provide an inclined elastic apron or shield in rear of the cylinder to receive and guide the potatoes to the ground without scattering them as they are thrown from the cylinder; and, fourth, to provide an improved connection with the cylinder, so as to hold the latter down to its work or up out of contact with the ground.

With these and other objects in view the said invention consists in certain details of construction and combination of parts, as hereinafter set forth, and particularly pointed out in the claims.

Figure 1:
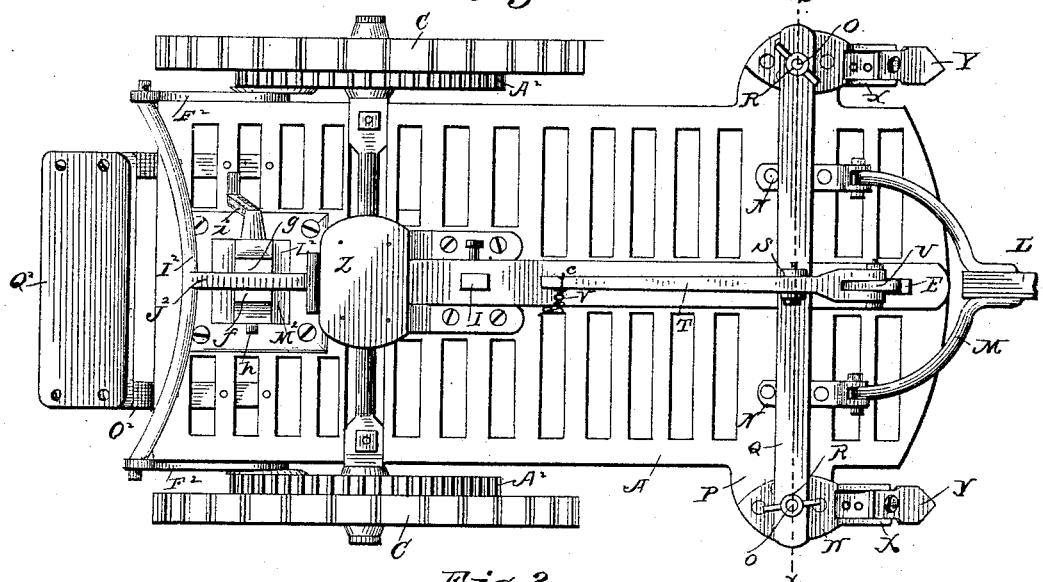
Figure 2:
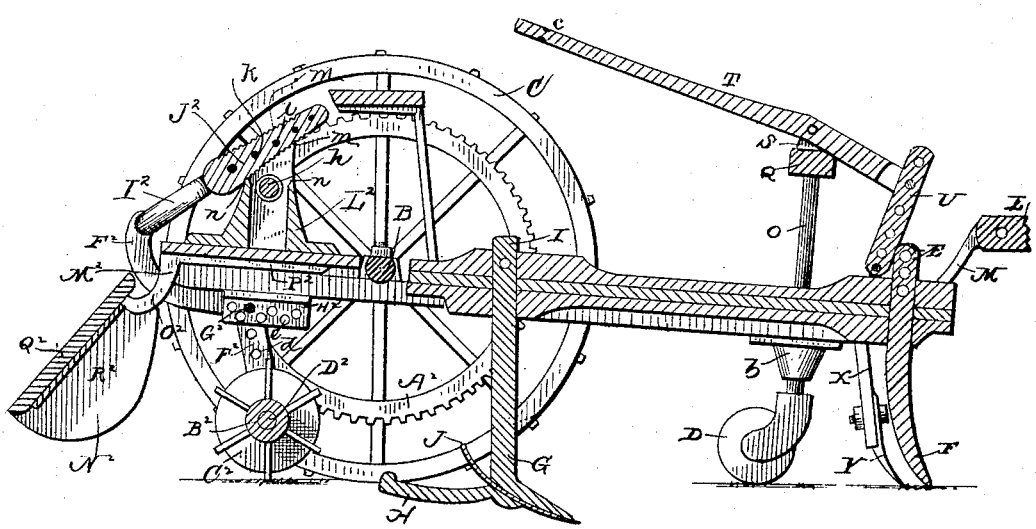
Figure 3:
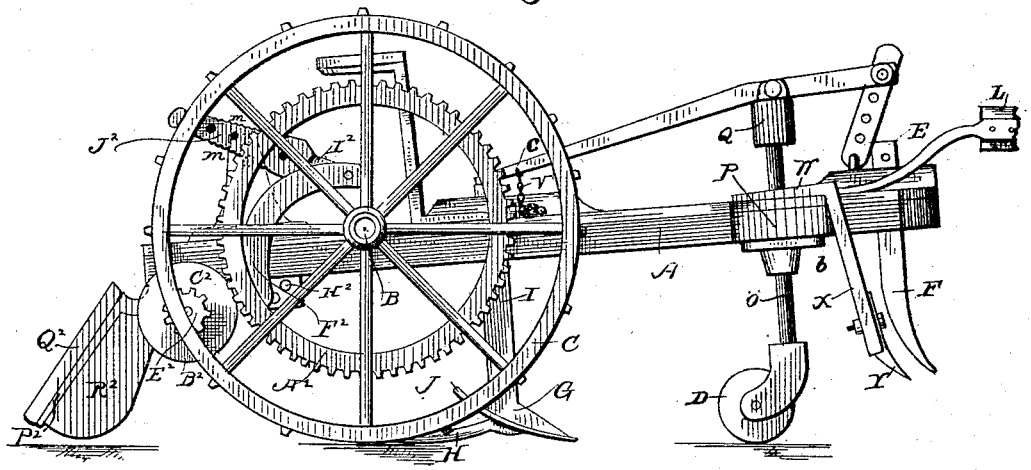
Figure 4:
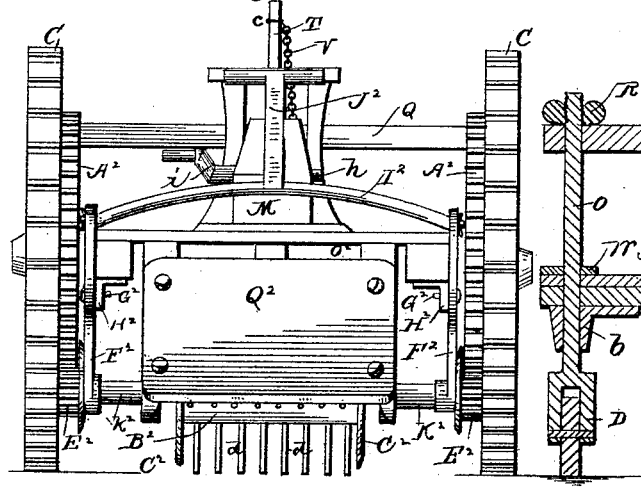
Figure 5:
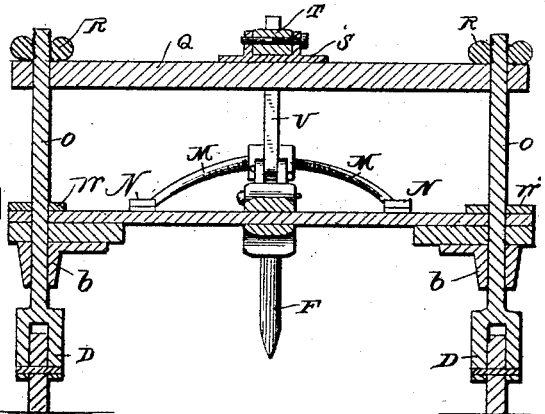
Figure 6:
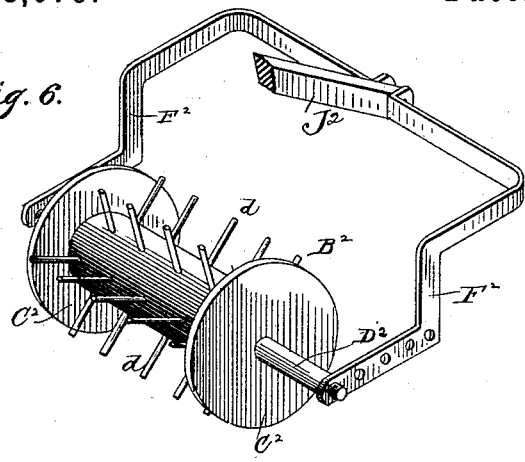
Figure 7:
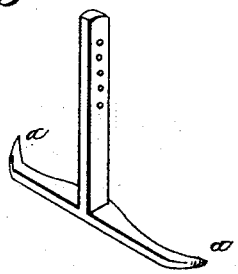
Figure 8:
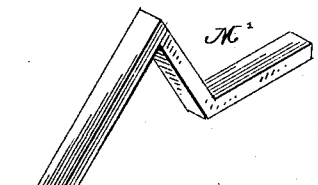
Figure 9:
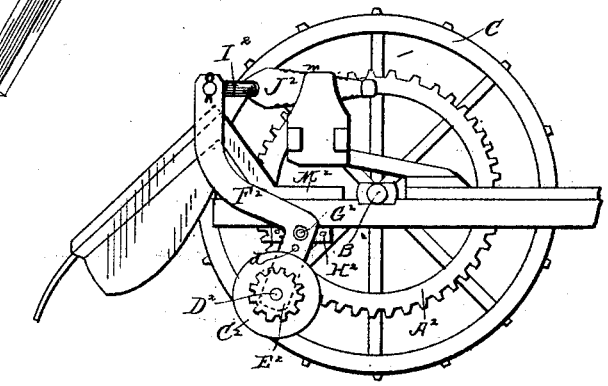
Figure 11:
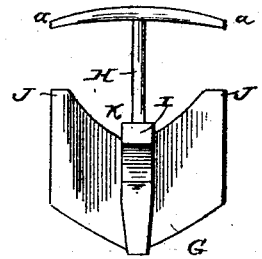
Figure 10:
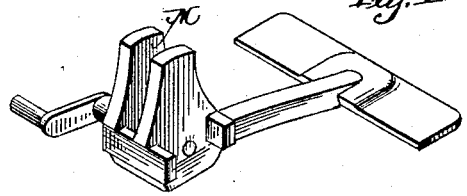

In the accompanying drawings, Figure 1 is a plan view of my improved potato-digger, the parts being shown in operative position. Fig. 2 is a longitudinal sectional view of the same. Fig. 3 is a side view, the toothed cylinder being thrown up above the ground. Fig. 4 is a rear end view of Fig. 1. Fig. 5 is a transverse sectional view on the line *x z*, Fig. 1. Fig. 6 is a detail view of the fingered cylinder and its connections, showing the improved arrangement of teeth. Fig. 7 is a detail view of the T-shaped horn attached to an independent adjustable standard. Fig. 8 is a detail view of the arm or spring of the apron when the latter is secured to the sides of the frame instead of to the sides of the platform. Fig. 9 is a side view of the machine, the front portion being broken away, showing an improved plan of attaching the apron and vise in position. Fig. 10 is a detail view of the vise mounted on an arm; and Fig. 11 is a plan view of the main share.

Like letters refer to corresponding parts in the several figures.

Referring to the drawings, A designates the frame of the machine, oblong in form, secured to a stationary axle, B, provided with driving-wheels C C, near the rear end of the frame, and two vertically-adjustable casters, D D, near the forward end thereof, a sufficient space being left between the wheels and casters to allow the machine to have a firm steady motion.

To the center of the frame A, at the forward end, is attached a standard, E, vertically adjustable in the frame, as shown, and having its share or point F inclined slightly forward to divide the hills and vines centrally. The main share G, with the attached T-shaped horn or extension H, is placed in the rear of the forward opening-share, and about midway between it and the driving-axle, the standard I of the main share being vertically adjustable in the frame, and the share being curved from the center toward the sides at the front edge, and provided with lateral wings J to force the soil inward, and having a central opening, K, for the passage of the soil to the rear. The T-shaped horn or extension has its points *a* curved forward to force the soil inward instead of outward, as in my former patents.

L designates the tongue of the machine, to which are attached the forward ends of curved plates or arms M, the rear ends of the latter being attached to eyes or castings N N, secured to the upper face of the frame A.

The casters D D are attached to stems O O, which turn in sockets *b*, formed in the side projections, P, of the frame, the upper ends of the stem being threaded and connected by a cross-head, Q, thumb-screws R, screwing on the ends of the stems and holding the cross-head adjustably in position thereon.

A lever, T, is fulcrumed in a plate, S, secured to the cross-head Q, and is bifurcated at its forward end to clasp a perforated plate, U, attached to the front end of the frame, and at its rear end is notched or hooked at $c$, a chain, V, being attached to the frame and having one of its links engaging with the notch or hook of the lever T to hold the latter either in its raised or lowered position. By pressing down on the lever the stems of the casters are forced downward through the sockets, so as to elevate the forward end of the frame, and by raising the lever the sockets and front of the frame are likewise lowered. The chain serves to engage with the lever to hold the forward end of the frame in an elevated or lowered position, the casters being likewise adjusted to support the said end in any desired position.

To the side projections, P, of the frame are attached plates W, provided with downwardly-extending inclined arms X', arranged in front of the casters, shares Y Y being secured to the arms and vertically adjustable in an oblique line, and arranged to clear all obstructions from the common track of the casters and drive-wheels, so as to give a uniform level to the digging apparatus.

Z designates the seat secured to the frame more or less in front of the driving-axle, so as to be convenient to the front and rear lever and vise, hereinafter described.

The driving-wheels C C are mounted loosely on the journals of the axles B, and may be of any convenient size to allow space enough under the frame for the digging apparatus to work freely, the frame being either supported on or suspended from the axle.

To the inner face of the driving-wheels are secured gear-wheels $A^2 A^2$, which are preferably formed integral with the driving-wheels, so as to turn therewith.

$B^2$ designates the revolving-cylinder, constructed of wood and banded, or of iron, as shown in the drawings, and comprising a drum-shaped device having its heads or disks $C^2$ of iron or steel with smooth or notched edges, the teeth $d$ being secured to the cylinder in rows, each alternate row having one or more tooth than the next adjacent row, so that the teeth will be arranged in a zigzag series around the cylinder, the teeth of one row registering with the spaces between the teeth of the other row, thus providing fewer teeth with larger spaces between the same, and yet the cylinder will have greater sifting power. The cylinder $B^2$ is mounted on a transverse shaft, $D^2$, provided with pinions $E^2$ at its ends, engaging with the gear-wheels $A^2$, formed integral with the driving-wheels, the operation of which causes motion to be imparted to the shaft to revolve the cylinder in the manner well known. Arms $F^2$ $F^2$ are attached at their lower ends to the shaft $D^2$, and suspend the same beneath the frame, and are pivoted on adjustable bolts $G^2$, passing through brackets $H^2$, attached to the sides of the frame, the arms being curved and having their upper ends connnected by a cross-bar, $I^2$, provided with an operating handle or lever, $J^2$, the operation of which serves to throw the pinions $E^2$ into and out of gear with the wheels $A^2$. A series of holes, $d$ $e$, are formed in the arms and brackets, and by changing the pivot-bolt $G^2$ from one hole to the other the cylinder can be adjusted forward or backward and higher or lower, as may be found desirable.

Sleeves or collars $K^2$ are attached to the shaft $D^2$, between the cylinder $B^2$ and the lower ends of the arms $F^2$, to prevent vines or other matter from wrapping around the axle or shaft.

In order to throw the cylinder sufficiently upward to pass obstructions, its arms $F^2$ are more or less curved, a raised platform, $L^2$, being arranged in rear of the seat Z to support the holding devices of the arms. Upon this platform or extension is mounted a vise, $M^2$, of the usual construction, having a stationary jaw, $f$, and a movable jaw, $g$, the operating screw-threaded rod $h$ with handle $i$ connecting the two jaws and operating in the usual manner to cause the movable jaw to bind the lever $J^2$ against the stationary jaw. When the lever $J^2$ is pushed back, the arms $F^2$ are pushed forward to throw the pinions $E^2$ into the gear with the gear-wheels $A^2$ on the driving-wheels, and then by turning the cross-bar $I^2$ in its bearings the lever is moved forward, so as to come between the two jaws of the vise, which are then closed fast to hold the cylinder in the proper position for operation. To ungear the pinions, the vise is opened and the lever is operated to draw the arm $F^2$ forward, the pinions being withdrawn from engagement with the gear-wheels, and the cylinder being drawn back into the position shown in Fig. 3, the cross-bar $I^2$ being turned backward on its bearings, so as to cause the lever $J^2$ to fit in the vise, which holds the cylinder up out of the way while passing obstructions, or when the machine is not in use. The lever $J^2$ is formed with a series of holes, $k$, through which a pin, $l$, may be passed, as shown, while the upper and lower edges of the lever are serrated, as at $m$, said serrations engaging with corresponding teeth, $n$ in the front and rear of the fixed jaw a little lower than the threaded rod $h$. These additional features may be used alone or in connection with the vise, as may be desired, to provide a more secure means for holding the cylinder up.

To the under side of the platform or extension $L^2$ are attached the spring-metal arms $M^2$ of the apron or shield $N^2$, said spring-arms being formed with a semicircular bend, $O^2$, having an angular arm, $P^2$, this peculiar shape of the arms serving to suspend the apron or shield away from the frame, and providing a recess for the cylinder $B^2$ when it is thrown up out of the way between the rear end of the platform $L^2$ and the front end of the apron. Said shield or apron comprises an inclined back wall, $Q^2$, and curved sides $R^2$, the arms $P^2$ being secured between the sides and the back wall and serving to strengthen the attachment of the apron. The inner face of the back wall is lined with some elastic material—such as rubber—so that it will not injure the potatoes, or the entire apron or shield may be formed of webbing or other elastic material, so that when the cylinder in operation throws the potatoes against the apron or shield they will not become bruised or otherwise injured.

The operation of my invention will be readily understood from the foregoing description, taken in connection with the annexed drawings. In this machine the frame is intended to run nearly level, the apparatus in front being a little lower than the cylinder in the rear. In front the share F parts the hills centrally, so as to break off all the roots to the depth of the hills, the ground being left solid on each side. The main share then breaks up the whole of the hills, the T-shaped horn running midway between the top and bottom of the hills, and tearing out all the roots and dragging them to the surface. The toothed cylinder works the potatoes to the surface out of the loosened soil and drives them against the apron or shield, which receives the potatoes as they are thrown backward over the cylinder, and guides them to the ground without scattering. The cylinder, by its rotary motion, throws the potatoes to the surface and the vines to either side, the disks C² on the cylinder preventing the potatoes and dirt from flying off laterally and the vines from clinging to the teeth. In passing obstructions the cylinder is first thrown up out of gear and the front part of the machine is elevated, when the digging apparatus will pass over the ground freely. In starting the digger the front is lowered to the proper level, and the cylinder is thrown into gear and fastened.

The three operations of the front share, main share, and cylinder are separate and more or less apart, so as not to interfere with one another, and thus clogging is avoided. The spaces between the two shares and the cylinder can be increased or diminished by lengthening or shortening the frame. The objection to most potato-diggers is that all of them break the hills at one operation, the roots not being broken off centrally, so that they will hang to the standards and cannot be thrown to either side by the rotary motion of the cylinder. My improved digger first parts the hills and breaks off all the roots, then breaks up the whole of the hills and tears out all the roots and drags them to the surface, and finally throws the vines to one side and leaves the potatoes in good condition for picking.

It will be seen that the adjustable shares, running in line with the casters and drive-wheels, serve to clear all obstructions from the path of the same, and form a common track for the wheels to run in, and thus give a uniform level to the digging apparatus and obviate too frequent adjustment. The main share forces the soil inward, the soil escaping through the opening K to the rear, and the T-shaped horn or extension gathering the soil inward instead of forcing it outward, as in my former patents. In Fig. 7 I have shown the horn or extension attached to an independent standard and provided with a series of holes to adjust the horn to different depths. Either this form or the one shown in the remaining figures, in which the horn is attached to the main share, may be used and perform the necessary functions with equal efficiency.

By placing the cylinder and its connections in the rear of the axle instead of in front, as is usually the case, the cylinder has more room for operation. In Fig. 6 is shown more clearly the improved plan of setting the teeth in the cylinder, as described, and also an improved manner of forming the arms connecting with the shaft supporting the cylinder, said arms F² being bent inward half-way and bolted together with the lever J², thereby avoiding the use of the cross-bar I². (Shown in the remaining figures.) The arms and cylinder are operated in a similar way to that described.

In some cases it may be found desirable to avoid the use of the raised platform, and in that case some other means must be adopted for supporting the vise and the apron, and I have shown these modifications in Figs. 8 and 9. Fig. 9 shows a central projecting arm secured to the frame in front of the driving-axle and extending rearwardly over the cylinder, the vise being secured to the rear end of the arm and operating in the manner described to hold the cylinder in its raised or lowered positions. Fig. 8 shows one of the spring-arms M² of the apron or shield secured to the sides of the frame, the said apron being thereby suspended higher above the ground and slightly above the frame of the machine.

The vise and the operating-levers of the cylinder and frame are to be so placed as to be readily operated from the seat.

In order that the operator may see how his work is progressing, the frame between the casters and the seat may be grated or slotted, as shown. The frame or platform over the cylinder may also be slotted or open, in order that the operator may observe the work performed by the same.

My improvements herein shown and described will make the potato-digger shown in my former patents more effective in use, so that the potatoes may be dug from the hills in good condition for picking without any danger of injuring the same.

Having described my invention, I claim—

1. In a potato-digger, the combination, with the frame formed with side projections, the driving-wheels and casters having their stems working through the side projections, the said casters and wheels running on a common track, means for raising and lowering the stems to effect the adjustment of the frame, plates secured to the projections and having downwardly-extending inclined arms, and adjustable shares secured to the arms to clear the track from all obstructions, as set forth.

2. In a potato-digger, the combination, with the frame, of the herein-described share having its front end curved from the center toward the sides, wings or extensions on the sides of the share, an opening in the rear thereof, and a T-shaped horn or extension having its ends bent forward, as and for the purpose set forth.

3. In a potato-digger, the combination, with the frame and its driving-wheels and casters, of the parting forward share, main share, T-shaped horn or extension, revolving cylinder, and apron or shield, as set forth.

4. In a potato-digger, the combination, with the frame and the revolving cylinder, of an apron or shield comprising the inclined padded back wall, $Q^2$, the sides $R^2$, and arms for suspending the shield away from the frame, as set forth.

5. The combination, with the revolving cylinder and its shaft, of arms connecting with the latter, a cross-bar journaled in the arms and carrying an extension or lever which is notched or serrated on its faces, and a vise, the said notches engaging with the jaws of the latter, as set forth.

6. The combination, with the revolving cylinder and its share, of arms connecting with the latter and a cross-bar turning in the arms either forward or backward and a vise or its equivalent for holding the cross-bar in its adjusted positions, as set forth.

In testimony that I claim the foregoing as my own I have hereto affixed my signature in presence of two witnesses.

HIRAM STRAIT.

Witnesses:
  H. F. BLACKWELL,
  E. C. TRAVER.